(12) United States Patent
Inada et al.

(10) Patent No.: US 10,330,337 B2
(45) Date of Patent: Jun. 25, 2019

(54) OUTDOOR UNIT

(71) Applicant: Toshiba Carrier Corporation, Kawasaki-shi, Kanagawa (JP)

(72) Inventors: Yuji Inada, Fuji (JP); Mitsunobu Maezawa, Fuji (JP); Takahiko Mukai, Fuji (JP); Tetsuya Ishikawa, Fuji (JP)

(73) Assignee: TOSHIBA CARRIER CORPORATION, Kawasaki-shi (JP)

( * ) Notice: Subject to any disclaimer, the term of this patent is extended or adjusted under 35 U.S.C. 154(b) by 0 days.

(21) Appl. No.: 15/594,181

(22) Filed: May 12, 2017

(65) Prior Publication Data

US 2017/0248329 A1    Aug. 31, 2017

Related U.S. Application Data

(63) Continuation of application No. PCT/JP2015/082134, filed on Nov. 16, 2015.

(30) Foreign Application Priority Data

Nov. 18, 2014   (JP) ................................ 2014-233836

(51) Int. Cl.
*F24F 11/89*   (2018.01)
*F24F 11/30*   (2018.01)
(Continued)

(52) U.S. Cl.
CPC ............ *F24F 11/89* (2018.01); *F24F 1/22* (2013.01); *F24F 11/30* (2018.01); *H04B 5/0037* (2013.01);
(Continued)

(58) Field of Classification Search
CPC combination set(s) only.
See application file for complete search history.

(56) References Cited

U.S. PATENT DOCUMENTS

| 6,293,697 B1 * | 9/2001 | Gul ...................... H01H 37/04 |
| | | 174/547 |
| 8,322,151 B1 * | 12/2012 | Garofalo ............... G01K 13/00 |
| | | 62/127 |

(Continued)

FOREIGN PATENT DOCUMENTS

| EP | 2 253 894 A2 | 11/2010 |
| EP | 2 667 110 | 11/2013 |

(Continued)

OTHER PUBLICATIONS

International Search Report and Written Opinion of the International Searching Authority in connection with PCT International Application No. PCT/JP2015/082134 including English language translation of the International Search Report.

(Continued)

*Primary Examiner* — Zhitong Chen
(74) *Attorney, Agent, or Firm* — John P. White; Cooper & Dunham LLP

(57) ABSTRACT

According to one embodiment, an outdoor unit is provided with a housing, an outdoor heat exchanger, and a communication unit. The housing has a ventilation opening and contains the outdoor heat exchanger. The communication unit is disposed within the housing at a position facing the ventilation opening and performs contactless data communication with a nearby information terminal.

5 Claims, 5 Drawing Sheets

(51) Int. Cl.
    *F24F 1/22*     (2011.01)
    *H04B 5/00*     (2006.01)
    *F24F 110/00*     (2018.01)
    *F24F 110/12*     (2018.01)

(52) U.S. Cl.
    CPC ....... *F24F 2110/00* (2018.01); *F24F 2110/12* (2018.01); *H04B 5/0031* (2013.01); *H04B 5/0075* (2013.01)

(56) References Cited

U.S. PATENT DOCUMENTS

| | | |
|---|---|---|
| 2004/0024846 A1 | 2/2004 | Randall et al. |
| 2010/0226104 A1 | 9/2010 | Takeichi et al. |
| 2010/0292864 A1 | 11/2010 | Sung et al. |
| 2010/0292960 A1 | 11/2010 | Sung et al. |
| 2013/0161403 A1* | 6/2013 | Douglas ............ F24F 11/001 236/49.3 |
| 2013/0231047 A1 | 9/2013 | Ogawa |
| 2013/0297081 A1 | 11/2013 | Kawai |
| 2015/0051739 A1* | 2/2015 | Song .................. G05B 15/02 700/276 |
| 2015/0362928 A1* | 12/2015 | Schmidlin ........ G05B 19/0426 700/276 |
| 2017/0248336 A1 | 8/2017 | Yamane et al. |

FOREIGN PATENT DOCUMENTS

| | | | |
|---|---|---|---|
| JP | 10-111001 | 4/1998 | |
| JP | 2003-148790 | 5/2003 | |
| JP | 2005-195209 A | 7/2005 | |
| JP | 2006-132870 | 5/2006 | |
| JP | 2006-165627 A | 6/2006 | |
| JP | 2006-200874 A * | 8/2006 | ............... F24F 5/00 |
| JP | 2007-040584 | 2/2007 | |
| JP | 2007-322086 | 12/2007 | |
| JP | 2008-101867 A | 5/2008 | |
| JP | 2008-281231 | 11/2008 | |
| JP | 2009-237237 A * | 10/2009 | ............ G03B 21/14 |
| JP | 2012-89910 A | 5/2012 | |
| JP | 2013-93766 | 5/2013 | |
| JP | 5197549 B2 | 5/2013 | |
| JP | 2013-120035 | 6/2013 | |
| JP | 2013-218559 | 10/2013 | |
| JP | 2014-55739 A | 3/2014 | |

OTHER PUBLICATIONS

Feb. 2, 2016 ISR (and English translation thereof) and Written Opinion of the International Searching Authority in connection with PCT/JP2015/082135.

Jun. 18, 2018 Extended European Search Report issued by the European Patent Office in connection with European Patent Application No. 15 861 507.0.

Oct. 26, 2018 non-final Office Action in connection with commonly-owned U.S. Appl. No. 15/594,161.

Jan. 23, 2019 Amendment in Response dated Oct. 26, 2018 non-final Office Action in connection with commonly-owned U.S. Appl. No. 15/594,161.

Aug. 13, 2018 extended European search report in connection with corresponding Europan patent application No. 15860145.0.

\* cited by examiner

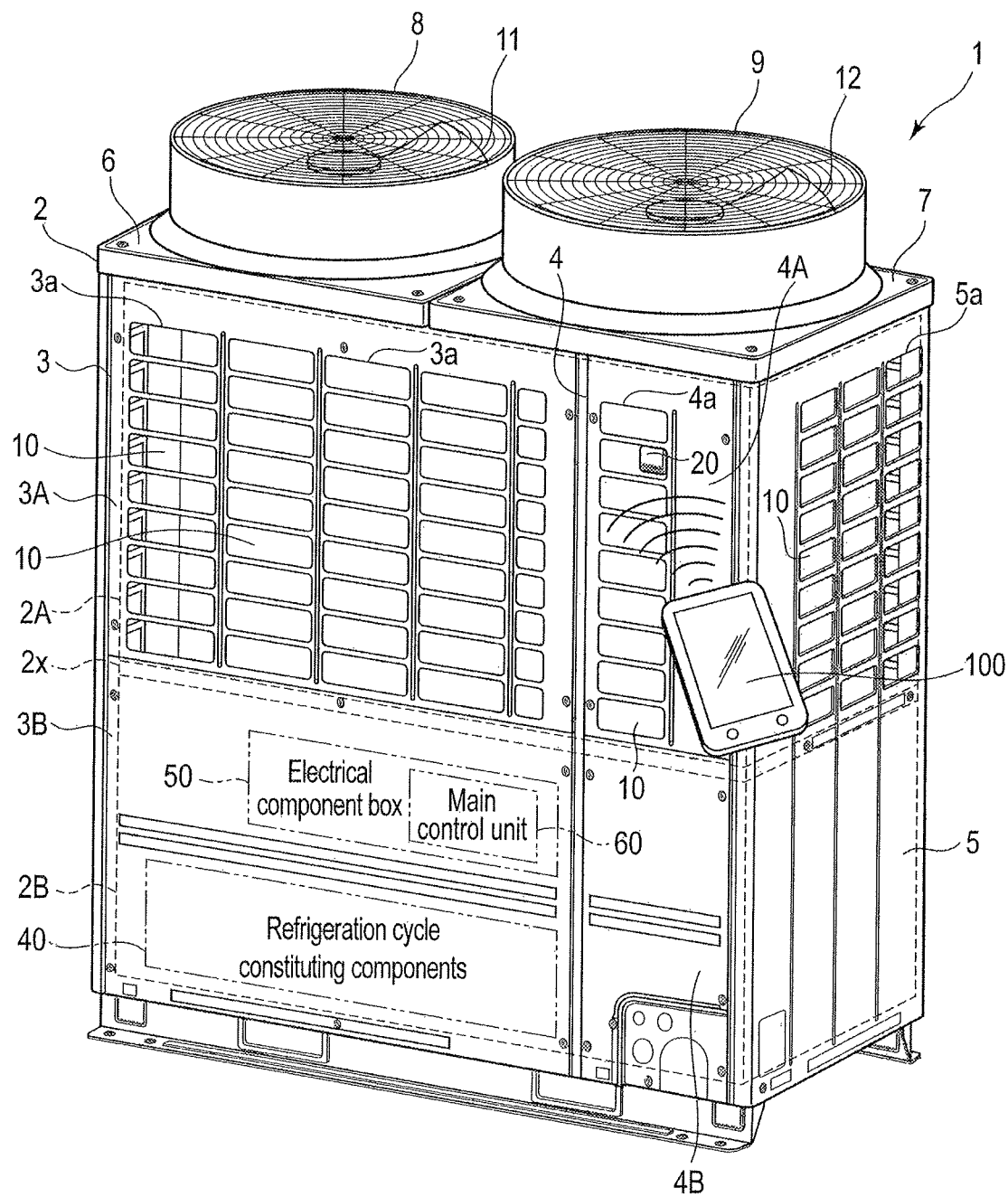
F I G. 1

OUTDOOR UNIT

CROSS-REFERENCE TO RELATED APPLICATIONS

This application is a Continuation Application of PCT Application No. PCT/JP2015/082134, filed Nov. 16, 2015 and based upon and claiming the benefit of priority from Japanese Patent Application No. 2014-233836, filed Nov. 18, 2014, the entire contents of all of which are incorporated herein by reference.

FIELD

Embodiments described herein relate generally to an outdoor unit for a refrigeration cycle apparatus such as an air conditioning apparatus.

BACKGROUND

There is a known setting-diagnosis system. In the system, a transmitter-receiver having a function of near-field communication (NFC) is provided in the outdoor unit of a refrigeration cycle apparatus such as an air conditioning apparatus. Contactless data communication is performed between the transmitter-receiver and an information terminal to set various types of data necessary to operate the outdoor unit and diagnose the state of the outdoor unit. The transmitter-receiver operates with the electricity generated by electromagnetic induction due to radio waves transmitted from the information terminal.

The housing of the outdoor unit is formed of a metal plate, which is a magnetic material. To prevent the plate from disturbing data communication, an opening is formed in the housing of the outdoor unit, and the transmitter-receiver is provided in the opening. An openable and closable cover is attached to the opening to shield the transmitter-receiver from wind and rain. (JP 5197549 B)

When a worker performs the above data setting or diagnosis near the outdoor unit, the worker needs to open and close the cover of the opening. This opening and closing operation is troublesome for the worker, and leads to work delay. In particular, if data setting or diagnosis is repeated for a large number of outdoor units, the workload is increased. This increase leads to a further work delay. If the cover of the opening is open when it rains or snows, rain or snow infiltrates into the inside of the outdoor unit. Thus, the worker may not be able to even perform data setting or diagnosis.

Embodiments described herein aim to provide an outdoor unit which allows easy and steady data communication with an information terminal without any operation for opening or closing a cover.

BRIEF DESCRIPTION OF THE DRAWINGS

FIG. 1 is a perspective illustration showing an external appearance according to an embodiment.

DETAILED DESCRIPTION

Figure 2:
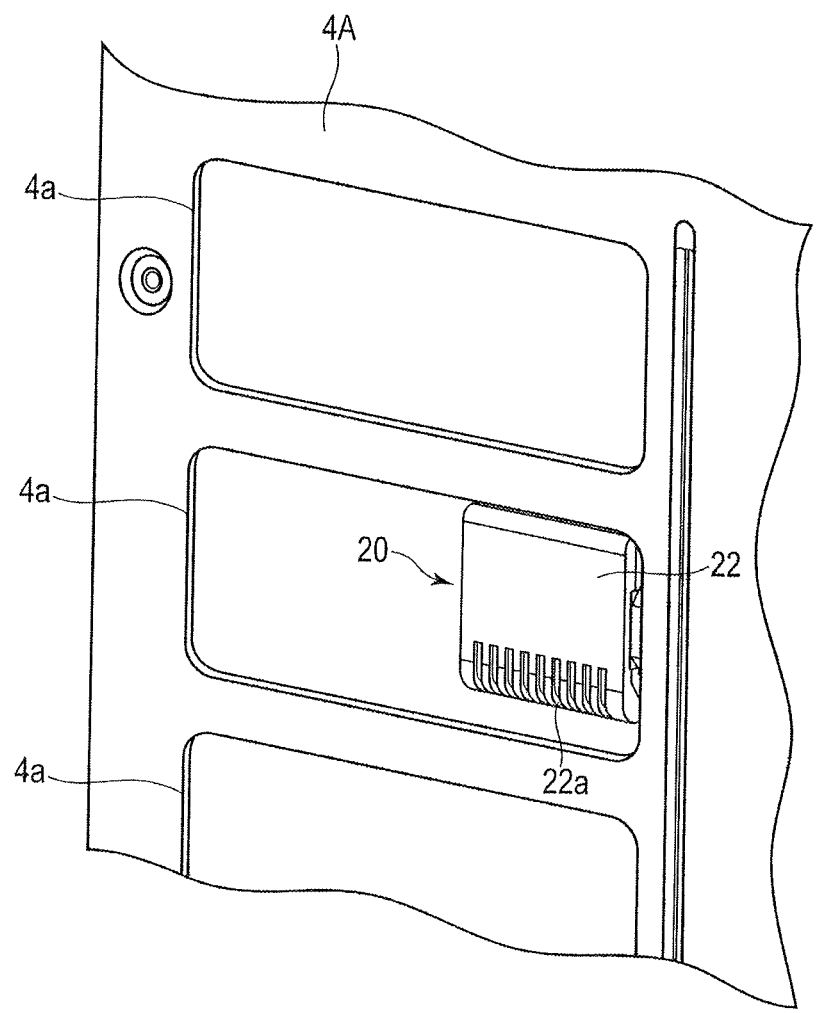
FIG. 2 is an enlarged view of a relevant part of FIG. 1.

In general, according to one embodiment, an outdoor unit comprises a housing, an outdoor heat exchanger and a communication unit. The housing comprises a ventilation opening and houses the outdoor heat exchanger. The communication unit is provided in the housing at a position facing the ventilation opening and performs contactless data communication with a nearby information terminal.

An embodiment will be explained below.

As shown in FIG. 1, the outline of an outdoor unit 1 is formed by a cubic housing 2. The housing 2 includes front plates 3 and 4, a right side plate 5, top plates 6 and 7, a left side plate, a rear plate, and a bottom plate. Front plates 3 and 4, the right side plate 5, the left side plate, the rear plate and the bottom plate are formed of metal, excluding top plates 6 and 7.

Front plate 3 is divided into an upper front plate 3A and a lower front plate 3B in a vertical direction. Each of upper and lower front plates 3A and 3B is removable. Upper front plate 3A comprises a large number of rectangular ventilation openings (inlets) 3a which are vertically and horizontally arranged. Front plate 4 is divided into an upper front plate 4A and a lower front plate 4B in a vertical direction in a manner similar to that of front plate 3. Each of upper and lower front plates 4A and 4B is removable. Upper front plate 4A comprises a large number of rectangular ventilation openings (inlets) 4a arranged in a vertical direction. The right side plate 5 comprises a large number of rectangular ventilation openings (inlets) 5a which are vertically and horizontally arranged. The left side plate comprises a large number of ventilation openings (inlets) which are vertically and horizontally arranged in a manner similar to that of the right side plate 5. Each of top plates 6 and 7 comprises a circular ventilation opening. Cylindrical fan housings 8 and 9 are formed so as to cover the ventilation openings of top plates 6 and 7, respectively.

The inside of the housing 2 is divided into an upper heat exchange chamber 2A and a lower machinery chamber 2B by an intermediate divider 2x. The heat exchange chamber 2A is closed by upper front plates 3A and 4A. The machinery chamber 2B is closed by lower front plates 3B and 4B.

An outdoor heat exchanger 10 and outdoor fans 11 and 12 are housed in the heat exchange chamber 2A. The outdoor heat exchanger 10 has a U-shape as seen in plan view. The outdoor heat exchanger 10 is placed on the intermediate divider 2x along the left side plate, upper front plates 3A and 4A and the right side plate 5 of the housing 2 such that the outdoor heat exchanger 10 is close to these plates. The internal space of the outdoor heat exchanger 10 communicates with fan housings 8 and 9 via the ventilation openings of top plates 6 and 7, respectively. Outdoor fans 11 and 12 are provided at positions corresponding to fan housings 8 and 9.

Refrigeration cycle constituting components 40 and an electrical component box 50 are housed in the machinery chamber 2B. The refrigeration cycle constituting components 40 collectively mean a compressor, a four-way valve, a receiver tank, an accumulator, etc. The electrical component box 50 houses a plurality of drive circuits which drive the compressor, outdoor fans 11 and 12, etc., and a main control unit (circuit board) 60. The main control unit 60 controls the operation of the refrigeration cycle constituting components 40 and the drive circuits, sets data necessary to operate the outdoor unit 1 based on mutual data communication between a communication unit 20 and an information terminal 100 as described later, and diagnoses the state of the outdoor unit 1. For example, the internal components of the machinery chamber 2B are exchanged or fixed by removing lower front plates 3B and 4B.

When outdoor fans 11 and 12 rotate, external air is drawn into the heat exchange chamber 2A through the ventilation openings of the left side plate, ventilation openings 3a and 4a of upper front plates 3B and 4B and ventilation openings 5a of the right side plate 5. The drawn air passes through the outdoor heat exchanger 10, and further goes through outdoor fans 11 and 12 and fan housings 8 and 9. Subsequently, the air is discharged to the outside of the housing 2. The air passing through the outdoor heat exchanger 10 exchanges heat with a refrigerant flowing through the outdoor heat exchanger 10.

As shown in the enlarged view of FIG. 2, the communication unit 20 is provided at a position corresponding to, of ventilation openings 4a of upper front plate 4A, for example, the second ventilation opening 4a from the top, between upper front plate 4A of the housing 2 and the outdoor heat exchanger 10. The height position of the second ventilation opening 4a from the top is substantially equivalent to the eye level of a worker standing next to the housing 2.

Figure 3:
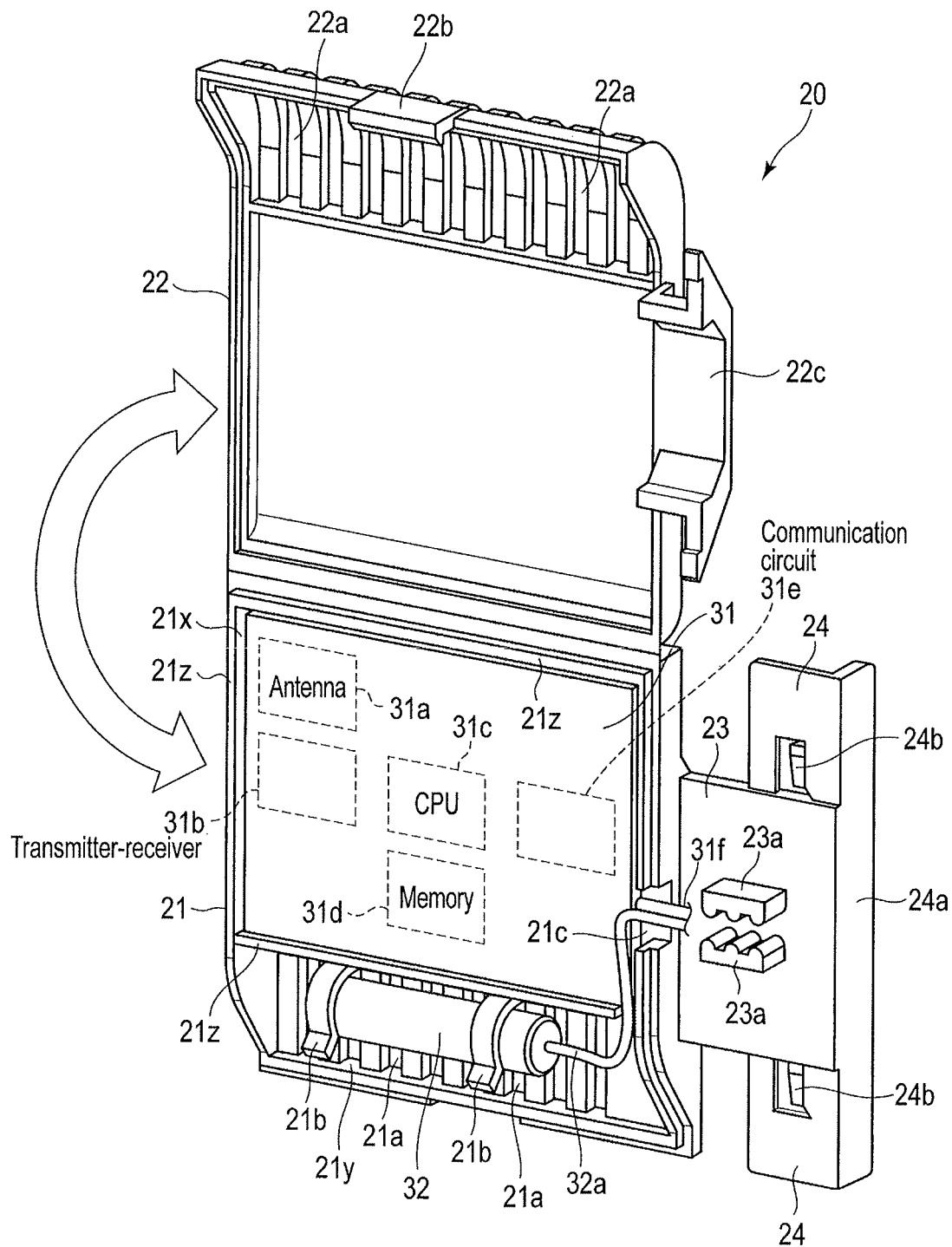
FIG. 3 is a perspective illustration showing the structure of a communication unit according to the embodiment.

As shown in FIG. 3, the outer circumference of the communication unit 20 is formed by a base portion 21 and a cover portion 22 pivotably supported in the upper edge of the base portion 21 such that the cover portion 22 is openable and closable. The base portion 21 is formed of a nonmagnetic material such as plastic, and is rectangular. Similarly, the cover portion 22 is formed of a nonmagnetic material such as plastic, and is rectangular.

The base portion 21 comprises a rectangular board-holding portion (a first holding portion) 21x formed from the upper region to the middle region, a concave sensor-holding portion (a second holding portion) 21y formed in the lower region, and a frame member 21z formed along the peripheral border of the board-holding portion 21x. A data communication unit (circuit board) 31 having the shape of a rectangular plate is held by the board-holding portion 21x such that the data communication unit 31 fits in the board-holding portion 21x. A large number of ventilation openings (first ventilation openings) 21a having a cut shape in a vertical direction are arranged in a horizontal direction in the sensor-holding portion 21y. A tubular outside air temperature sensor 32 is provided in the sensor-holding portion 21y sideways. The outside air temperature sensor 32 is held by a pair of elastic hooks 21b such that the outside air temperature sensor 32 is caught by hooks 21b. The frame member 21z prevents intrusion of rainwater into the board-holding portion 21x.

The data communication unit 31 is structured by providing an antenna 31a, a transmitter-receiver 31b, a CPU 31c, a memory 31d, a communication circuit 31e, etc., on a board. When the information terminal 100 is close to the data communication unit 31 within a very short distance of each other, for example, within approximately 1 to 10 cm of each other, the data communication unit 31 operates with the electricity generated by electromagnetic induction due to radio waves transmitted from the information terminal 100, and performs contactless data communication with the information terminal 100, using the near-field communication (NFC) technology.

The antenna 31a transmits or receives radio waves to/from the nearby information terminal 100. The transmitter-receiver 31b transmits or receives a signal through the antenna 31a, and loads the radio waves received in the antenna 31a as the operation power of the data communication unit 31. The CPU 31c performs various processes for data communication. The memory 31d stores a program necessary to control the CPU 31c, and temporarily stores received data and transmitted data. The communication circuit 31e performs data communication between the transmitter-receiver 31b and the main control unit 60 via a signal line 31f.

The outside air temperature sensor 32 detects outside air temperature. A signal line 32a of the outside air temperature sensor 32 extends to the outside of the base portion 21 via a groove portion 21c formed in the right side edge of the base portion 21 together with signal line 31f of the data communication unit 31. Signal lines 31f and 32a extending from the groove portion 21c are guided to the machinery chamber 2B along a refrigerant pipe connecting the outdoor heat exchanger 10 of the heat exchange chamber 2A and the refrigeration cycle constituting components 40 of the machinery chamber 2B, and are connected to the main control unit 60 of the machinery chamber 2B. Since signal lines 31f and 32a can be collectively extended to the main control unit 60, the wiring work can be simplified.

The communication unit 20 comprises a plate-like portion 23 laterally extending from the right side edge of the base portion 21, and an attachment portion 24 vertically extending from the plate-like portion 23 in a plate-like form. In a manner similar to that of the base portion 21 and the cover portion 22, the plate-like portion 23 and the attachment portion 24 are formed of a nonmagnetic material such as plastic.

The plate-like portion 23 comprises a pair of holding members 23a for holding signal lines 31f and 32a extending from the groove portion 21c such that both signal line 31f and signal line 32a are interposed between the holding members 23a. The attachment portion 24 comprises a bent piece 24a formed by bending the attachment portion 24 in an L-shape to the outdoor heat exchanger 10 side in the right side edge, and a pair of hooks 24b in the upper and lower parts.

The cover portion 22 covers the entire area of the internal side of the base portion 21 including the data communication unit 31 and the outside air temperature sensor 32 from above. A large number of ventilation openings (second ventilation openings) 22a having a cut shape in a vertical direction are arranged in a horizontal direction in the lower region of the cover portion 22. Ventilation openings 22a face the sensor-holding portion 21y of the base portion 21 when the cover portion 22 is closed. The cover portion 22 comprises an engagement claw 22b in the lower edge, and a signal line cover 22c in the right side edge. When the cover portion 22 is closed, the engagement claw 22b engages with the lower edge of the base portion 21 and keeps the closed state of the cover portion 22. When the cover portion 22 is closed, the signal line cover 22c covers the groove portion 21c of the base portion 21 and signal lines 31f and 32a provided in the groove portion 21c, and partially covers signal lines 31f and 32a extending from the groove portion 21c.

Figure 4:
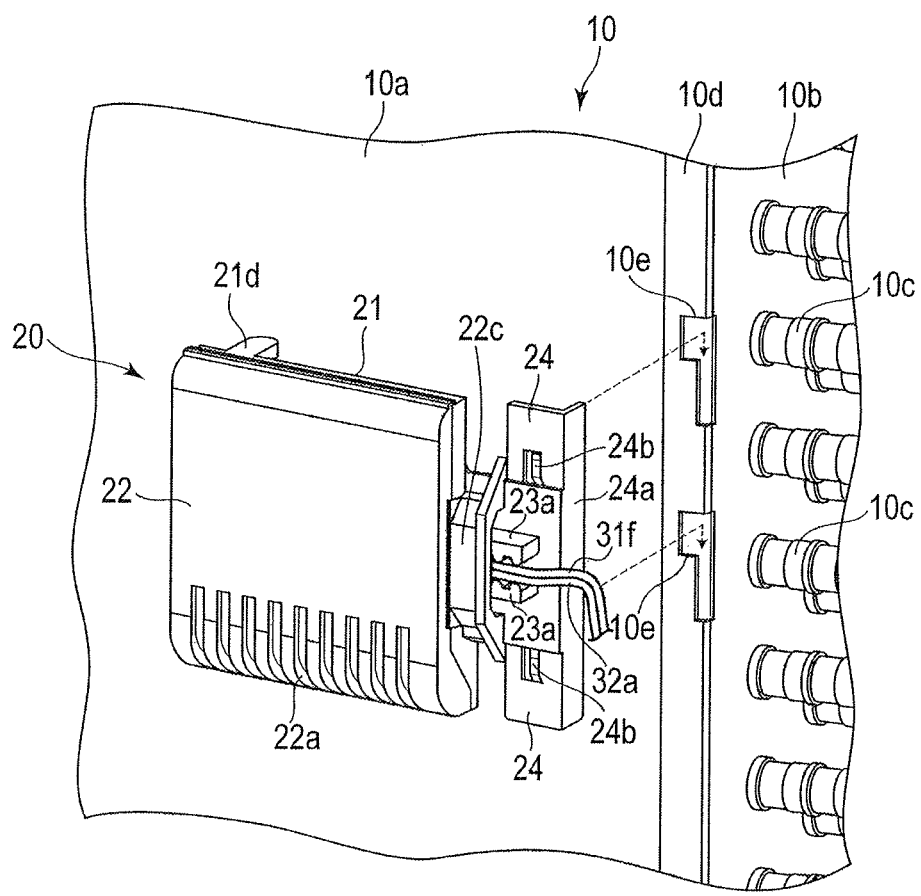
FIG. 4 shows the procedure for attaching the communication unit according to the embodiment.
Figure 5:
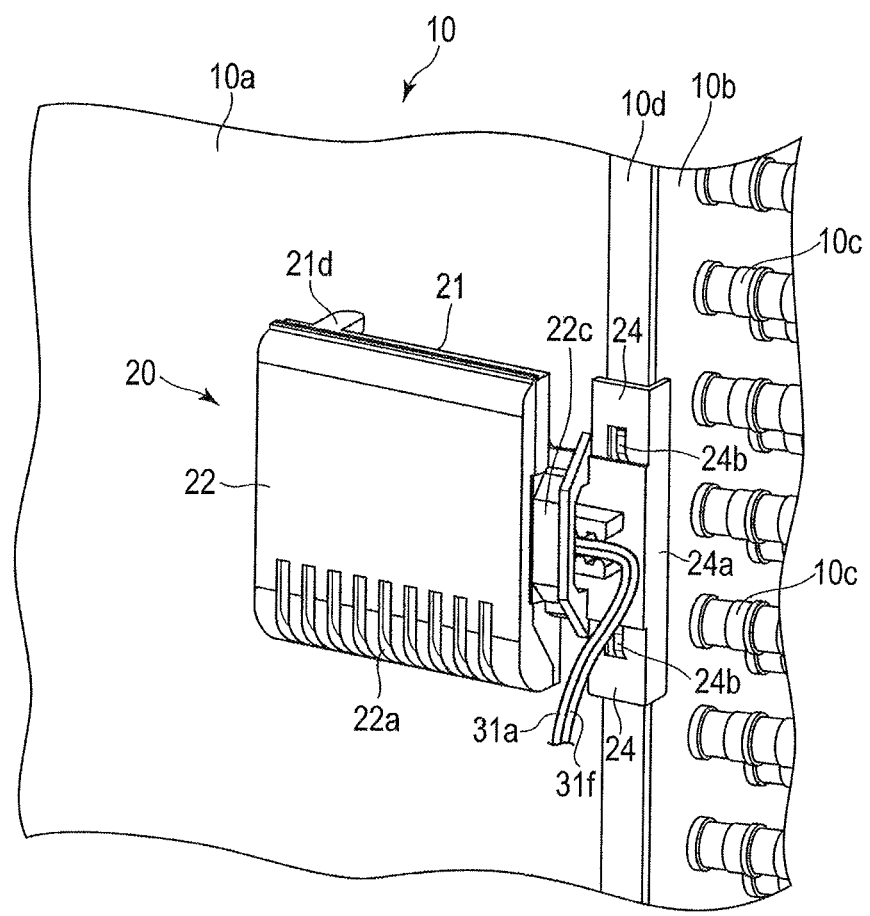
FIG. 5 shows a state in which the communication unit is attached to an outdoor heat exchanger according to the embodiment.

As shown in FIG. 4 and FIG. 5, the communication unit 20 in which the cover portion 22 is closed is removably attached to a predetermined position of the outdoor heat exchanger 10. FIG. 4 and FIG. 5 partially show a front portion 10a and a right side portion 10b of the outdoor heat exchanger 10.

The front portion 10a of the outdoor heat exchanger 10 faces upper front plates 3A and 4A of the housing 2. The right side portion 10b of the outdoor heat exchanger 10 faces the right side plate 5 of the housing 2. A large number of heat exchange pipes 10c provided in the outdoor heat exchanger 10 are exposed from the right side portion 10b. A plate-like member 10d is attached along the right edge portion of the front portion 10a of the outdoor heat exchanger 10. The plate-like member 10d is formed of, for example, iron, and comprises a pair of engagement holes 10e having an inverted-L-shape at predetermined positions in a vertical direction.

As shown by dashed arrows in FIG. 4, the pair of hooks 24b of the attachment portion 24 of the communication unit 20 is inserted into the engagement holes 10e of the outdoor heat exchanger 10. The inserted hooks 24b engage with the lower edges of the engagement holes 10e when hooks 24b move downward along the shape of the engagement holes 10e. In this manner, as shown in FIG. 5, the attachment portion 24 makes surface contact with the plate-like member 10d. Further, the bend piece 24a of the attachment portion 24 makes surface contact with the right side portion 10b of the outdoor heat exchanger 10. Thus, the attachment of the communication unit 20 to the outdoor exchanger 10 is completed.

After the completion of the attachment, the entire area of the cover portion 22 of the communication unit 20 faces the second ventilation opening 4a of upper front plate 4A of the housing 2 from the top. As described above, the height position of the second ventilation opening 4a from the top is substantially equivalent to the eye level of a worker standing next to the housing 2.

A projecting spacer 21d is formed on the rear surface of the base portion 21. The distal end of the spacer 21d is directly in contact with the front portion 10a of the outdoor heat exchanger 10 after the completion of the attachment of the communication unit 20. By this direct contact, an appropriate distance is secured between the cover portion 22 of the communication unit 20 and upper front plate 4A. The appropriate distance means that the cover portion 22 is as close to ventilation openings 4a as possible without making contact with upper front plate 4A. The cover portion 22 does not protrude from upper front plate 4A through ventilation opening 4a.

To remove the communication unit 20, the communication unit 20 should be merely lifted upward and pulled. By this action, hooks 24b of the attachment portion 24 can be easily removed from the engagement holes 10e. In this way, the removal of the communication unit 20 is completed.

When a worker performs data setting or diagnosis for the outdoor unit 1, he or she comes close to upper front plate 4A of the housing 2 and moves the information terminal 100 in hand close to the second ventilation opening 4a of upper front plate 4A from the top. At this time, the worker can easily recognize the communication unit 20 provided in the second ventilation opening 4a from the top since the ventilation opening 4a is provided at his/her eye level. The worker operates the information terminal 100 close to the ventilation opening 4a and performs contactless data communication between the information terminal 100 and the communication unit 20. The main control unit 60 performs a data setting process and a diagnosis process for the outdoor unit 1 based on data communication with the information terminal 100 via the communication unit 20. For the information terminal 100, for example, a tablet information terminal or a smartphone information terminal is used.

As the content of data setting, for example, various parameters related to the operation of the outdoor unit 1 are set, and a control program is updated. As the content of diagnosis, for example, the operation history or the failure of the outdoor unit 1 is confirmed.

When data communication is performed between the information terminal 100 and the communication unit 20, the radio waves emitted from the information terminal 100 are not disturbed by magnetic upper front plate 4A and effectively reach the communication unit 20 through ventilation openings 4a. Similarly, the radio waves emitted from the communication unit 20 are not disturbed by magnetic upper front plate 4A and effectively reach the information terminal 100 through ventilation openings 4a.

The base portion 21 and the cover portion 22 forming the outer circumference of the communication unit 20 are nonmagnetic members. Thus, the radio waves emitted from the information terminal 100 can be effectively loaded into the data communication unit 31. Further, the ratio waves emitted from the data communication unit 31 can be effectively transmitted to the information terminal 100.

In this manner, contactless data communication can be easily and steadily performed between the information terminal 100 and the communication unit 20.

A worker merely has to hold the information terminal 100 close to ventilation opening 4a and operate the information terminal 100. There is no need to remove upper front plate 4A and attach it again. Thus, no complicated work is required. In this way, the workload of the worker can be reduced, and the working time can be reduced.

In particular, even when a large number of outdoor units 1 are provided, and a worker concurrently performs data setting or diagnosis for the outdoor units 1, the workload of the worker and the working time can be dramatically reduced. Data communication using the NFC technology does not require a coupling process for establishing communication with the information terminal 100. This advantage contributes to a beneficial effect to reduce the workload and the working time.

Even when a large number of outdoor units 1 are provided, and their side plates are tightly adjacent to each other, the respective communication units 20 are provided on the front surfaces of the housings 2. Thus, data communication can be easily and steadily performed with the communication units 20 of all the outdoor units 1.

Since the data communication unit 31 is held inside the communication unit 20, the data communication unit 31 is not exposed to wind or rain. Further, the frame member 21z is formed along the peripheral border of the board-holding portion 21x of the base portion 21. Moreover, ventilation openings 21a and 22a for the ventilation of outside air are formed in the lower regions of the base portion 21 and the cover portion 22, respectively. Thus, even when rainwater flows into ventilation openings 21a and 22a, the rainwater merely flows out of ventilation openings 21a and 22a, and does not infiltrate into the board-holding portion 21x. In this way, the failure or abnormal operation of the data communication unit 31 can be prevented.

When it rains or snows, a worker can perform data setting or diagnosis for the outdoor unit 1 by putting up an umbrella with a hand and operating the information terminal 100 with the other hand.

Since the outside air temperature sensor 32 is held inside the communication unit 20, there is no need to prepare a special holder for the outside air temperature sensor 32. As such a holder is unnecessary, the cost can be reduced. Moreover, the base portion 21 and the cover portion 22 of the communication unit 20 comprise ventilation openings 21a and 22a, respectively. Thus, outside air can be directly drawn into the outside air temperature sensor 32. Even in the structure comprising the outside air temperature sensor 32 housed in the communication unit 20, the outside air temperature can be accurately detected.

In the above embodiment, the communication unit 20 is provided at a position corresponding to the second ventilation opening 4a of upper front plate 4A from the top. However, the height position is not limited to this example, and can be appropriately determined. For example, in terms of security, the communication unit 20 may be provided at a position corresponding to a lower ventilation opening 4a as the internal side is difficult to see as a matter of course.

The above embodiment is explained, using the example of an outdoor unit for an air conditioning apparatus as an outdoor unit for a refrigeration cycle apparatus. However, the embodiment is not limited to an outdoor unit for an air conditioning apparatus. The embodiment may be applied to, for example, an air-cooled chilling unit, a heat source unit for a heat-pump water heater, a heat source unit for a heat-pump warming device, and a refrigerator connected to a refrigerated showcase.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

1 Outdoor unit
2 Housing
2A Heat exchange chamber
2B Machinery chamber
3 Front plate
3A Upper front plate
3B Lower front plate
3a Ventilation opening
4 Front plate
4A Upper front plate
4B Lower front plate
4a Ventilation opening
5 Right side plate
5a Ventilation opening
6 and 7 Top plates
8 and 9 Fan housings
10 Outdoor heat exchanger
10a Front portion
10b Right side portion
10c Heat exchange pipe
10d Plate-like member
11 and 12 Outdoor fans
20 Communication unit
21 Base portion
21x Board-holding portion
21y Sensor-holding portion
21z Divider
21a Ventilation opening
21b Hook
21c Concave portion
21d Spacer
22 Cover portion
22a Ventilation opening
22b Engagement claw
22c Signal line cover
23 Attachment member
23a Engagement claw
24 Bracket
24a Bent piece portion
24b Hook
31 Data communication unit
31a Antenna
31b Transmitter-receiver
31c CPU
31d Memory
31e Communication circuit
31f Signal line
32 Outside air temperature sensor
32a Signal line
100 Information terminal

What is claimed is:

1. An outdoor unit for a refrigeration cycle apparatus comprising:
   a housing comprising a ventilation opening;
   an outdoor heat exchanger housed in the housing;
   a communication unit which is provided in the housing at a position facing the ventilation opening, and performs contactless data communication with a nearby information terminal;
   an electrical component box housed in the housing;
   a main control unit which is provided in the electrical component box and connected to the communication unit via a signal line, and which sets data necessary to operate the outdoor unit and diagnoses a state of the outdoor unit based on data communication with the information terminal via the communication unit; and
   an outside air temperature sensor which detects outside air temperature;
   wherein the communication unit comprises:
   a data communication unit which performs the contactless data communication with the information terminal;
   a nonmagnetic base portion which holds the data communication unit and the outside air temperature sensor, and comprises a first ventilation opening at a position facing the outside air temperature sensor; and
   a nonmagnetic cover portion which covers the data communication unit and the outside air temperature sensor on the nonmagnetic base portion, and comprises a second ventilation opening at a position facing the outside air temperature sensor.

2. The outdoor unit for the refrigeration cycle apparatus of claim 1, wherein
   the communication unit is removably attached to a position facing the ventilation opening in the outdoor heat exchanger.

3. The outdoor unit for the refrigeration cycle apparatus of claim 1, wherein the communication unit comprises:
   a data communication unit which is connected to the main control unit via the signal line, and which operates with electricity generated by electromagnetic induction due to a radio wave transmitted from the information terminal, and performs contactless data communication with the information terminal by a near-field communication technology;
   a nonmagnetic base portion which holds the data communication unit; and
   a nonmagnetic cover portion which is openably and closably provided in the nonmagnetic base portion, and covers the data communication unit.

4. The outdoor unit for the refrigeration cycle apparatus of claim 3, wherein the nonmagnetic base portion comprises a groove portion for extending a signal line of the outside air temperature sensor and the signal line from the data communication unit, and the cover portion comprises a signal line cover for covering the groove portion and partially covering the signal lines extending from the groove portion.

5. The outdoor unit for the refrigeration cycle apparatus of claim 3, wherein the nonmagnetic base portion includes a first holding portion which holds the data communication unit, a second holding portion which holds the outside air temperature sensor, a first ventilation opening formed in the second holding portion, and a frame member formed along a peripheral border of the first holding portion.

* * * * *